United States Patent [19]

Witherell

[11] 4,369,987
[45] Jan. 25, 1983

[54] FOLDING WHEELED CHAIR/LUGGAGE CARRIER

[76] Inventor: Nancy B. Witherell, R.F.D. #1, Box 54A, Center Harbor, N.H. 03226

[21] Appl. No.: 244,285

[22] Filed: Mar. 16, 1981

[51] Int. Cl.³ .............................................. B62B 7/08
[52] U.S. Cl. .................................. 280/644; 248/166; 280/42; 280/650; 280/79.2; 297/45
[58] Field of Search .................. 280/42, 39, 642, 644, 280/650, 647, 654, 655, 651, 47.26, 47.28, 47.29, 47.19, 79.2, 79.3, 33.99 H; 297/42, 44, 45; 211/198, 199; 248/166, 170, 150

[56] References Cited

U.S. PATENT DOCUMENTS

| | | | |
|---|---|---|---|
| 2,419,790 | 4/1947 | Peltier | 280/642 |
| 3,736,021 | 5/1973 | MacLaren | 280/39 |
| 3,797,847 | 3/1974 | Lindsey et al. | 280/654 |
| 3,797,848 | 3/1974 | Burnham | 280/644 |
| 3,968,991 | 7/1976 | MacLaren | 280/39 |

FOREIGN PATENT DOCUMENTS 66159  8/1975  Australia ............................ 280/655

Primary Examiner—David M. Mitchell
Attorney, Agent, or Firm—Strimbeck, Davis & Soloway

[57] ABSTRACT

The invention relates to a folding wheeled chair/luggage carrier of the kind having a pair of side frames which can be folded between an erected, spaced side-by-side position and a stowage position via releasable locking means, and thereafter collapsed fan-wise into a stowage bundle, each side frame comprising pivotally connected back and base support and bracing bars and one or more struts which are pivotally connected between the free ends of said back and base support and bracing bars.

A pair of seat bars are pivotally connected at corresponding intermediate positions to respective back support bars of said side frames for pivoting between a stowage position substantially in alignment with said back support bars to a use position in which their free ends extend forwardly, a fabric seat panel being fixed between the seat bars. The free ends on the seat bars are supported in their use position by releasable catches mounted on locking sleeves constituting said locking means, which sleeves are attached to the bracing bars and are maintained, via stop means, in locking positions closely embracing the pivot connections of respective struts by the weight of the occupant, thereby ensuring the struts cannot collapse in use of the chair.

4 Claims, 14 Drawing Figures

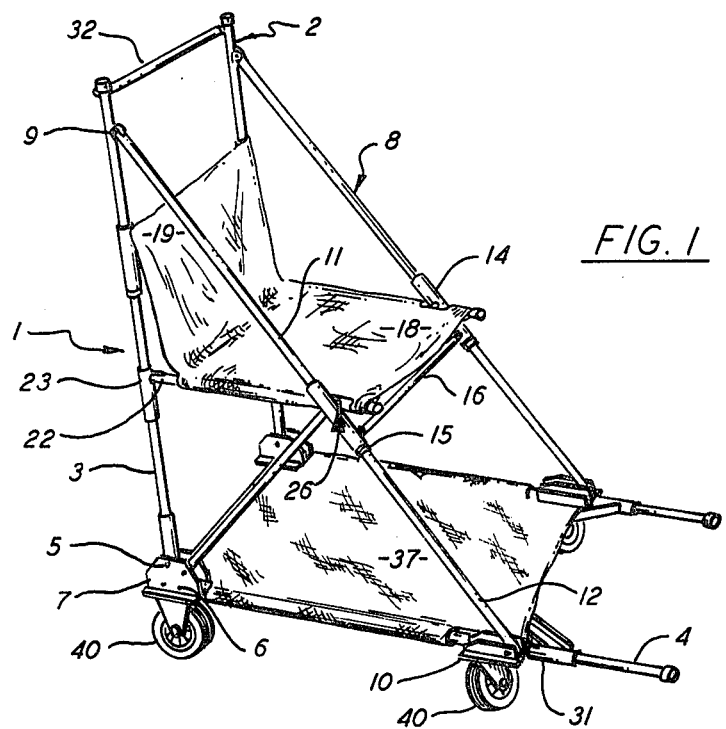
FIG. 1
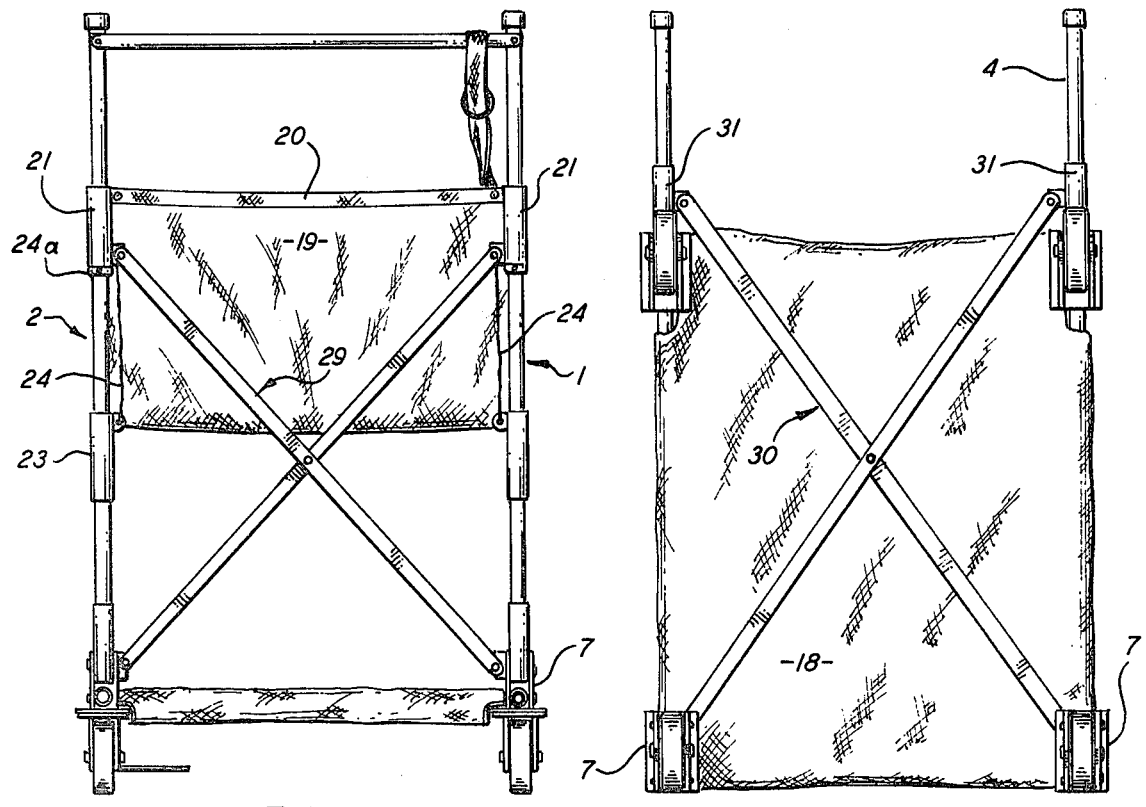
FIG. 2
FIG. 3

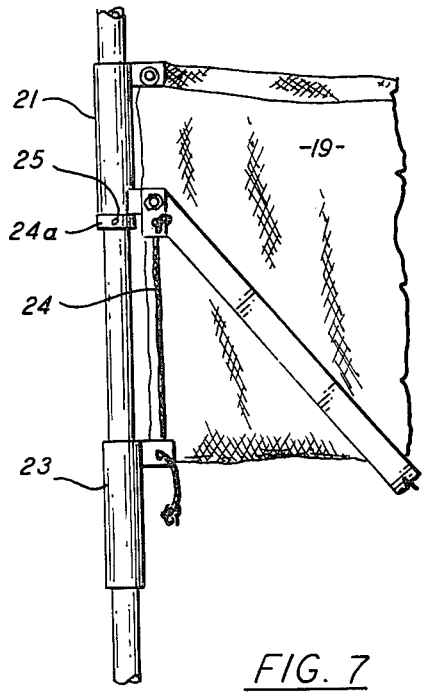
FIG. 7
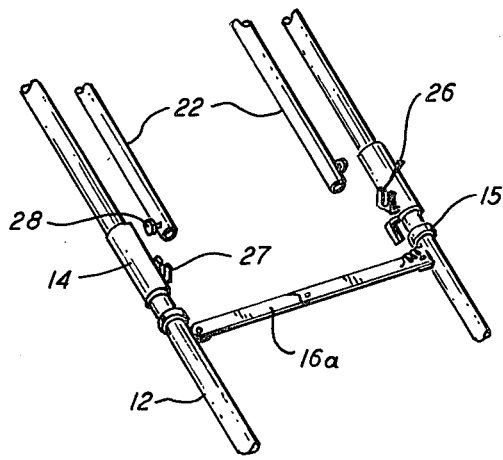
FIG. 8
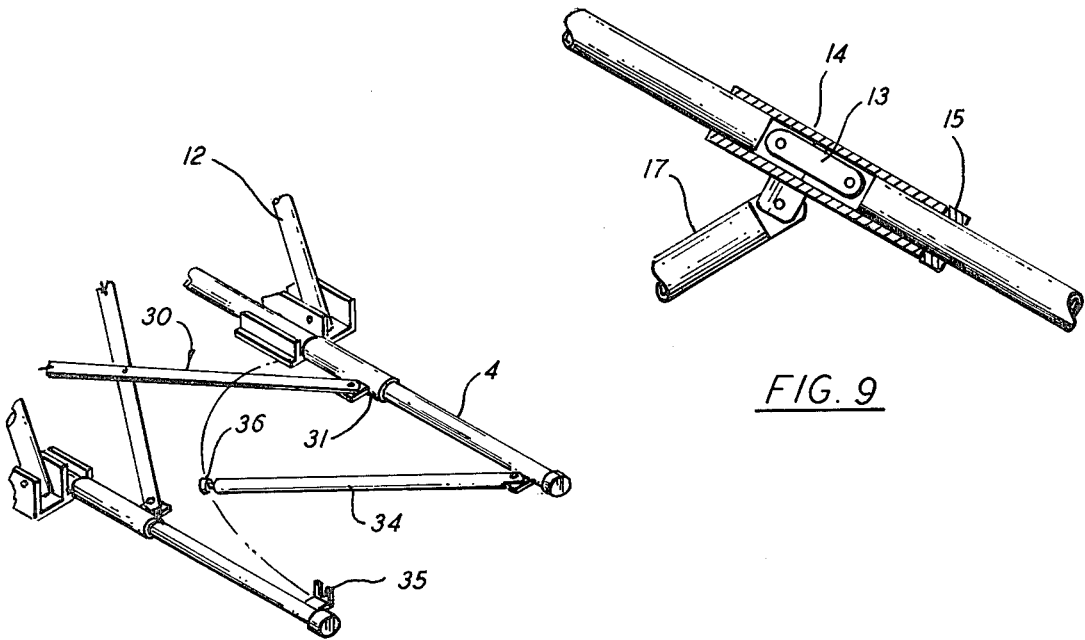
FIG. 9
FIG. 10

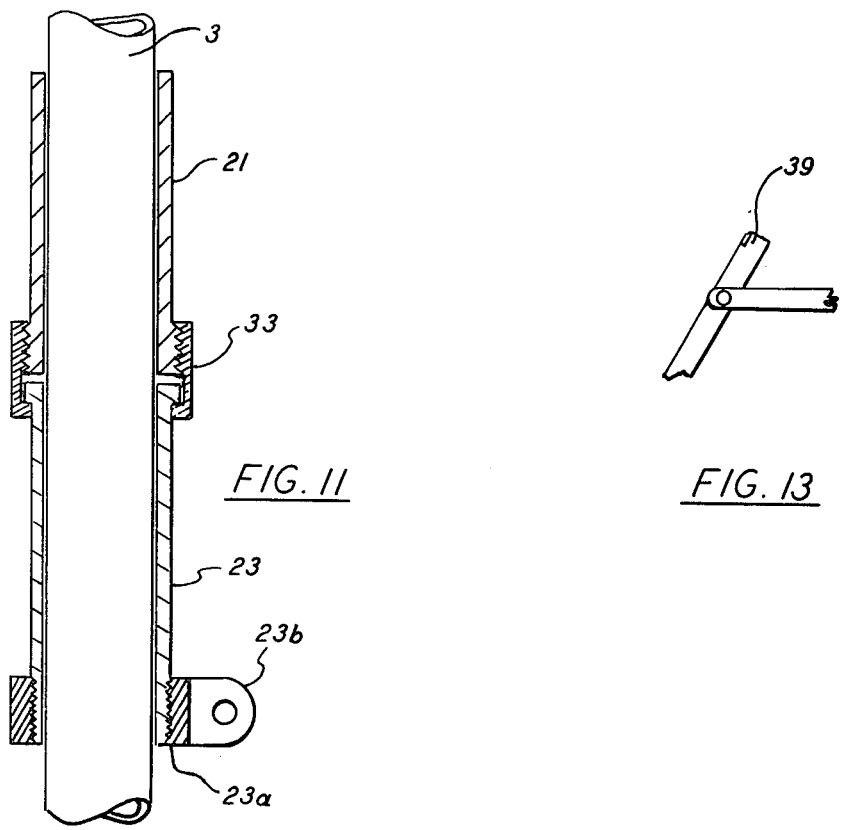
FIG. 11
FIG. 13
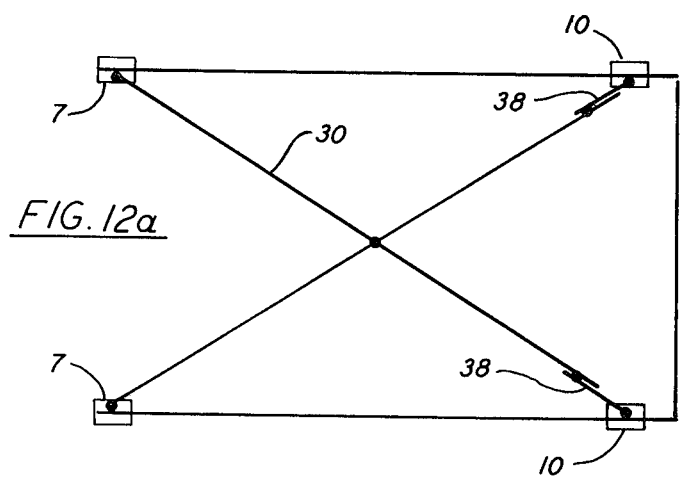
FIG. 12a
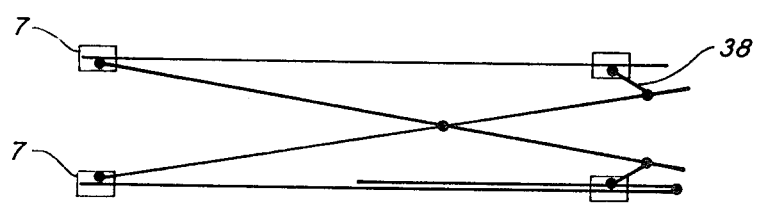
FIG. 12b

FOLDING WHEELED CHAIR/LUGGAGE CARRIER

BACKGROUND OF THE INVENTION

This invention relates to a folding wheeled chair/luggage carrier having a pair of side frames, each comprising pivotally connected, elongated base and back support members, at least one elongated strut which is pivotally connected between the free ends of said support members, releasable locking means for maintaining a desired angular relationship between said base and back support members, and a strut bracing member interconnecting the locking means and said pivotal connection, and lateral bracing means connecting said side frames whereby the latter are movable between an extended, use position in which they maintain the side frames in spaced side-by-side relationship and a retracted, stowage position.

Many prior art folding wheel chairs have side frames of generally triangular form, i.e. with a single diagonal strut for each side frame, which strut is in the form of a pair of pivotally connected upper and lower strut members which can be maintained in an extended, aligned condition. The frame members are generally made from lightweight, strong material such as aluminum tubing and are particularly suitable for use as strollers for small children. As example, of such folding wheel chairs is described in U.S. Pat. No. 3,797,848.

Other folding wheel chairs are intended for adults, e.g. invalids or crippled persons, in which case the frame structure needs to be capable of withstanding not only the extra weight of the occupant, but also loads caused when the chair is traveling over uneven grounds, or is tilted to cope with a curb, stair or the like. Because the frame structure of such a chair needs to be of sturdier construction, the side frames are often of quadrilateral instead of triangular form. Also, because of the extra loads involved, the design must be such that it is most unlikely to collapse in use. Side frames of quadrilateral form tend to be more stable in use since the upright frame members are substantially vertical; hence, loads are taken mostly in compression. Because of resistance to loading required, such chairs are significantly heavier and more complicated than strollers for small children. An example of such a chair is described in U.S. Pat. No. 3,968,991.

U.S. Pat. No. 3,736,021 describes a relatively lightweight folding wheel chair which is based on the design for a stroller with triangular side frames. This chair design is said to be capable of supporting an occupant of up to 154 lbs. in weight. In this design, the chair seat is suspended at least partially from the side frame strut members. Consequently, said strut members can be subjected to significant bending stresses which would tend to be concentrated in the area of the pivot connections on said strut members.

An object of the present invention is to provide a folding wheeled chair/luggage carrier which overcomes shortcomings of the prior art by its particular design of triangular side frames, which, in use, significantly reduces the bending stresses occurring on the pivot connections in the strut members.

Another object of the present invention is to provide such a folding wheeled chair/luggage carrier with locking means for the pivot connections or the strut members of such a form that, in use of the chair, the weight of the occupant is used to ensure that said strut members cannot collapse.

A further object of the present invention is to provide such a folding wheeled chair/luggage carrier which is of a particularly simple, lightweight construction, which, however, is capable of supporting an adult of normal weight (e.g. a 13 to 15 lb. example of the invention can support a 200 lb. person).

SUMMARY OF THE INVENTION

In accordance with the present invention, a folding wheeled chair/luggage carrier has a frame structure comprising a pair of generally triangular side frames, each carrying two support wheels and each comprising pivotally connected, elongated base and back support members, an elongated strut which is pivotally connected at its ends adjacent to the free ends of said support members, each said strut being in the form of a pair of pivotally connected upper and lower strut members which can be maintained in an extended, aligned condition and releasable locking means for maintaining a desired angular relationship between said base and back support members, and lateral bracing means connecting said side frames whereby the latter are movable between an extended, use position in which they maintain the side frames in spaced parallel relationship with the four wheels at substantially the four lower corners of the frame structure, and a retracted, stowage position, wherein the improvement comprises (a) a pair of elongated strut bracing members each pivotally connected to the releasable locking means and to adjacent the pivotal connection of the base and back support members.

(b) a pair of elongated seat frame members each pivotally connected to the frame structure, for pivotal movement between a stowage position and a use position, (c) seat and back support panels of foldable material extending between and fixed respectively to said seat frame members and said back support members, (d) releasable catch means for selectively retaining said seat frame members in their use position, and (e) said releasable locking means comprising a pair of sleeves slidably mounted one on each said upper strut member and stop means rigidly mounted on each said lower strut member beneath the pivotal connection whereby, in the use position of said seat members, said sleeves are held down by the occupant against their respective stop means so as to closely embrace the pivot connections between their respective strut members and positively retain said strut members in their extended, aligned condition, said bracing members being pivotally mounted to respective ones of said sleeves.

A seat panel of foldable material extends between and is fixed to said seat frame members and hence, together with a similar back panel between said back support members, is opened out when said side frames are moved apart into their use position. Similarly, a luggage support panel extends between the base members and is opened out in the use position.

The invention will now be described, by way of example, with reference to the accompanying drawings, in which:

FIG. 1 is a perspective view showing the folding chair in its erected, use condition;

FIG. 2 is a view from the rear of the erected chair;

FIG. 3 is an underview of the erected chair;

FIG. 7 is an enlarged detail of a fixing to a back support member;

FIG. 8 is an enlarged detail of combined releasable locking and catch means for the seat together with a transverse support bar located differently from that shown in FIG. 1;

FIG. 9 is an enlarged detail of said releasable locking means in its locked position;

FIG. 10 is an enlarged detail of the front, lower ends of the side frames;

FIG. 11 is an enlarged, exploded detail of a modified form of the fixing shown in FIG. 7;

Figure 4:
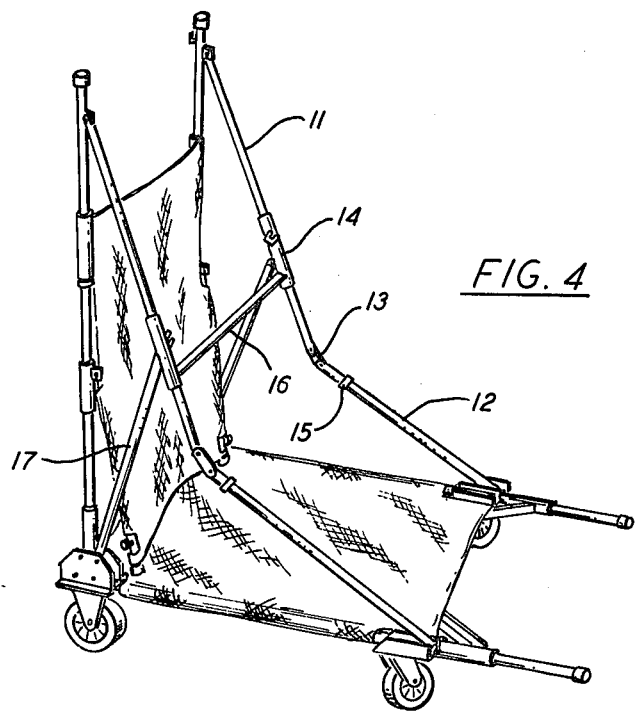
FIG. 4 is a view similar to FIG. 1 showing the chair partly collapsed.

FIGS. 12(a) and 12(b) are diagrammatic views showing the erected and retracted conditions of a modified form on the bottom lateral bracing for the side frames, and FIG. 13 is an enlarged detail of FIGS. 12(a) and 12(b).

PREFERRED EMBODIMENT OF THE INVENTION

Referring to the drawings and more particularly to the FIGS. 1 to 3, the folding wheel chair comprises two side frames 1, 2 of generally double triangular configuration, comprising a back support tube 3, a base support tube 4 and an elongated strut bracing member 17, pivotally interconnected at points 5, 6 respectively via a sturdy channel section rear bracket 7, and a diagonally extending strut 8. The back and base tubes of each side frame, when erected, are maintained in a desired angular relationship (preferably substantially at right angles as shown in FIG. 1) by the diagonally extending strut 8 which is pivotally connected at its ends adjacent to free ends of said back and base tubes and is braced at its center by bracing member 17, the upper pivot connection being effected by lugs 9 attached to the back tubes 3, the lower pivot connection being effected via the outer channels of a sturdy, double-channel section, front bracket 10 and the bracing member 17 being pivotally attached to slidable locking sleeves 14. Each strut 8 comprises upper and lower strut members 11, 12 respectively which are pivotally connected via a link 13 (see FIGS. 4 and 9). These strut members are retained in their extended, aligned condition as shown in FIG. 1 by releasable locking means in the form of the slidable locking sleeves 14 mounted one on each upper strut member 11 which can be held down against respective stop collars 15 rigidly connected to the lower strut members 12 in locking positions closely embracing their respective pivot links 13.

The locking sleeves 14 are connected together by a laterally extending, centrally pivoted tie bar 16. The tie bar's central pivot permits selected disconnection of the halves of the tie bar to facilitate carriage of luggage.

The seat and back support panels 18, 19 respectively of the chair are provided by one or more pieces of foldable fabric or other suitable sheet materials. The back support panel 19 is connected between the back support tubes 3 via an upper reinforced hem 20 or reinforcing strap of a strong material such as Nylon TM, pinned to sleeves 21 which are slidably mounted on each tube, whilst the seat panel extends between and is sewn around two seat frame bars 22, each pivotally connected to a further sleeve 23 slidably mounted on a respective back support tube 3. The sleeves 23 are supported from sleeves 21 at corresponding, intermediate positions on their tubes 3 by cords or cables 24, which length can be adjusted to set the seat panel 18 at a required angle to the ground. The stop collars 24a provide a positive stop for the sleeves 21. The pivotal connections to the sleeves 23 are such that the seat bars 22 can swing from a collapsed position substantially in alignment with the back support tubes 3 (see FIG. 4) to a use position in which the free ends of said seat bars extend forwardly and are retained by releasable catch means 26. Referring particularly to FIG. 8, the releasable catch means 26 each comprise a lug 27 rigidly mounted on each strut locking sleeve 14 which provides a U-shaped seating for receiving the shank of a laterally extending locking knob 28 which is attached to the free end of the respective seat bar 22. FIG. 8 shows in detail an alternative form of centrally pivoted and releasable tie bar 16a shown in a different position to that shown in FIGS. 1 and 4. Thus in FIG. 8, to provide clearance for the seat bars 22 to swing between their collapsed and use positions the tie bar 16 is set lower down and extends between the lower strut members 12.

Figure 6:
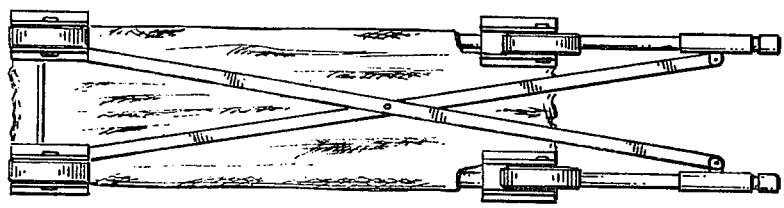
FIG. 6 is an underview of the fully collapsed chair.

The side frame members 1 and 2 are connected together by two pivoted "X" frames 29, 30, one frame 29 being connected between the back support tubes 3 via the sleeves 21 and the rear brackets 7 (see FIG. 3) and the other frame 30 being connected between the base support tubes 4 via said rear brackets 7 and slidable sleeves 31 mounted forwardly of the front brackets 10. The "X" frames thus control movement of the side frames 1 and 2 between their spaced, side-by-side, use position and their retracted, stowage position, e.g. as shown in FIG. 6). The effective change of length of the "X" frames 29, 30 during this movement is taken up by appropriate sliding movement or their respective sleeves 21 31. It will be appreciated that the two sets of sleeves 21 on the back support tubes will move in unison, particularly when the side frames 1, 2 are being moved to their retracted positions. Rather than subject the "X" frame 29 to stress during this retracting movement, cables 24 are connected between respective sleeves 21, 23 (see FIG. 7). Such an attachment permits relative rotation between respective sleeves thereby to permit each seat bar 22, as it is connected to or disconnected from its releasable catch means 26, to be swung slightly inwardly to clear tie bar 16 and to assume a correct position for folding.

The upper ends of back support tubes 3 are interconnected by a transverse handle bar 32 pivotally connected at one end to one tube 3 and removably attached at its other end to the other tube 3 to maintain the spacing of the tube ends while being foldable about its pivot connection to permit a desired collapse of the assembly.

In an alternative attachment arrangement for the sleeves 21, 23 (see FIG. 11), each sleeve 23 is rotatably mounted captively within a collar 33 screwed directly onto the lower end of the associated sleeve 21. A collar 23a, attached to the lower end of each lower sleeve 23, has a lug 23b to pivotally support respective seat frame bars 22.

Referring to FIG. 10, in order to fix the side frames 1, 2 positively in their spaced, side-by-side, use position and to provide a convenient foot-rest, a tie bar 34 may be pivoted at the free end of one base support tube 4 so as to be free to swing from a retracted position substantially parallel to said tube to a laterally extending position in which it can be fixed via a lug 35 on the other base support tube 4 via a locking knob 36 screwed into the free end of said tie bar. The spaced positions of the side frames 1 and 2 are also fixed by the centrally pivoting tie bar 16. If preferred, to provide an even more positive fixing for the side frames, the centrally pivoted tie bar 16 can be replaced with a tie bar and fixing arrangement similar to that just described.

It will be seen from FIG. 1 that, conveniently, the forwardly extending base support tubes 4, which are substantially horizontal can be used to support the side edges or a further piece of foldable fabric, or other suitable sheet material, so as to provide a horizontal carrying surface for luggage, groceries, etc. when the chair is in use. This fabric may also be used as a large package or luggage carrying surface when the seat 18 is folded down.

Referring to FIGS. 12(a) and 12(b), a modified form of the base "X" frame member 29 is shown, additional pivoted links 38 are provided which avoid the need to provide slidable sleeves 31. It can be seen that said additional links are so connected between the "X" frame and the front brackets 10 that they take up the change in effective length of the "X" frame when it is moved between its erected condition shown in FIG. 12(a) to its retracted condition shown in FIG. 12(b). The additional links 38 are effectively locked in the erected condition by turned-over lugs 39 (see FIG. 13) which act to embrace the frame members of said "X" frame. It will be appreciated that effective locking of the centrally pivoted tie bar 16 described hereinbefore in its extended condition is also achieved by a similar turned-over lug arrangement. It will also be appreciated that a similar modification can be carried out to the "X" frame 29 for the back support tubes 3.

The rear and front brackets 7 and 10 respectively provide convenient connection points for four casters 40, of which the front two wheels are preferably attached via a swivel joint.

Figure 5:
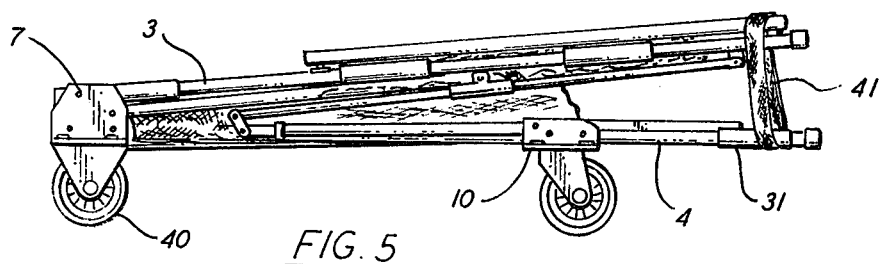
FIG. 5 is a side view of the chair showing it fully collapsed into a bundle.

To collapse the folding chair into a stowage bundle from its fully erected condition shown in FIGS. 1 to 3, the seat bars 22 are first released and swung downwardly to the luggage carrying position shown in FIG. 4, the footrest 34 (if any) and transverse handle bar 32 are folded, tie bar 16 is partially collapsed and the whole assembly is collapsed laterally. Subsequently the locking sleeves 14 are raised and the back and base tubes and bracing members are folded together, while the struts 8 fold about pivot links 13, to collapse the assembly horizontally to form a bundle as shown in FIGS. 5 and 6. Thereafter, a retaining strap 41 can be appropriately tied around the bundle (e.g. as seen in FIG. 5). It will be readily appreciated that the bundle can be fully erected by reversing these steps.

I claim:

1. A folding wheeled chair/luggage carrier having a frame structure comprising a pair of generally triangular side frames, each carrying two support wheels and each comprising pivotally connected, elongated base and back support members, an elongated strut which is pivotally connected at its ends adjacent to the free ends of said support members, each said strut being in the form of a pair of pivotally connected upper and lower strut members which can be maintained in an extended, aligned condition and releasable locking means for maintaining a desired angular relationship between said base and back support members, and lateral bracing means connecting said side frames whereby the latter are movable between an extended, use position in which they maintain the side frames in spaced parallel relationship with the four wheels at substantially the four lower corners of the frame structure, and a retracted, stowage position, wherein the improvement comprises
(a) a pair of elongated strut bracing members each pivotally connected to the releasable locking means and to adjacent the pivotal connection of the base and back support members,
(b) a pair of elongated seat frame members each pivotally connected to the frame structure, for pivotal movement between a stowage position and a use position,
(c) seat and back support panels of foldable material extending between and fixed respectively to said seat frame members and said back support members,
(d) releasable catch means for selectively retaining said seat frame members in their use position, and
(e) said releasable locking means comprising a pair of sleeves slidably mounted one on each said upper strut member and stop means rigidly mounted on each said lower strut member beneath the pivotal connection whereby, in the use position of said seat members, said sleeves are held down by the occupant against their respective stop means so as to closely embrace the pivot connections between their respective strut members and positively retain said strut members in their extended, aligned condition, said bracing members being pivotally mounted to respective ones of said sleeves.

2. A folding wheeled chair/luggage carrier according to claim 1 wherein;
(f) said seat frame members are pivotally connected at corresponding intermediate positions of respective back support members of said side frames for pivoting between a stowage position substantially in alignment with said back support members, to a use position, in which their free ends extend forwardly with respect to their said back support members, and
(g) said releasable catch means are carried by said releasable locking means.

3. A folding wheeled chair/luggage carrier as claimed in claim 2, wherein
(h) said releasable catch means comprising a lug on each locking sleeve with a generally U-shaped seating for receiving the shank of a laterally extending locking knob provided at the free end of the respective seat frame member.

4. A folding wheeled chair/luggage carrier as claimed in claim 1, wherein a luggage support panel of foldable material extends between said base support members.

* * * * *